United States Patent [19]
Simon et al.

[11] Patent Number: 4,922,507
[45] Date of Patent: May 1, 1990

[54] MULTIPLE TRELLIS CODED MODULATION

[75] Inventors: Marvin K. Simon, La Canada; Dariush Divsalar, Pacific Palisades, both of Calif.

[73] Assignee: California Institute of Technology, Pasadena, Calif.

[21] Appl. No.: 127,117

[22] Filed: Dec. 1, 1987

[51] Int. Cl.$^5$ .............................................. H04B 14/06
[52] U.S. Cl. ........................................ 375/26; 371/43; 375/27
[58] Field of Search .................. 375/27, 53, 67, 52, 375/54, 26, 17, 37; 371/56, 47, 43; 332/22

[56] References Cited

PUBLICATIONS

Divsalar and Simon, "Multiple Trellis Coded Modulation", 11/15/86; NASA, JPL Pub. 86–44.

Primary Examiner—Robert L. Griffin
Assistant Examiner—Marianne Huseman
Attorney, Agent, or Firm—William J. Benman, Jr.

[57] ABSTRACT

A technique for designing trellis codes to minimize bit error performance for a fading channel. The invention provides a criteria which may be used in the design of such codes which is significantly different from that used for average white Gaussian noise channels. The method of multiple trellis coded modulation of the present invention comprises the steps of: (a) coding b bits of input data into s intermediate outputs; (b) grouping said s intermediate outputs into k groups of $s_i$ intermediate outputs each where the summation of all $s_i$,s is equal to s and k is equal to at least 2; (c) mapping each of said k groups of intermediate outputs into one of a plurality of symbols in accordance with a plurality of modulation schemes, one for each group such that the first group is mapped in accordance with a first modulation scheme and the second group is mapped in accordance with a second modulation scheme; and (d) outputting each of said symbols to provide k output symbols for each b bits of input data.

8 Claims, 12 Drawing Sheets

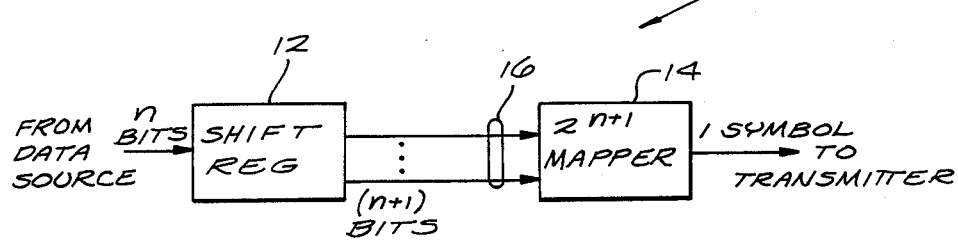
FIG. 1(a)
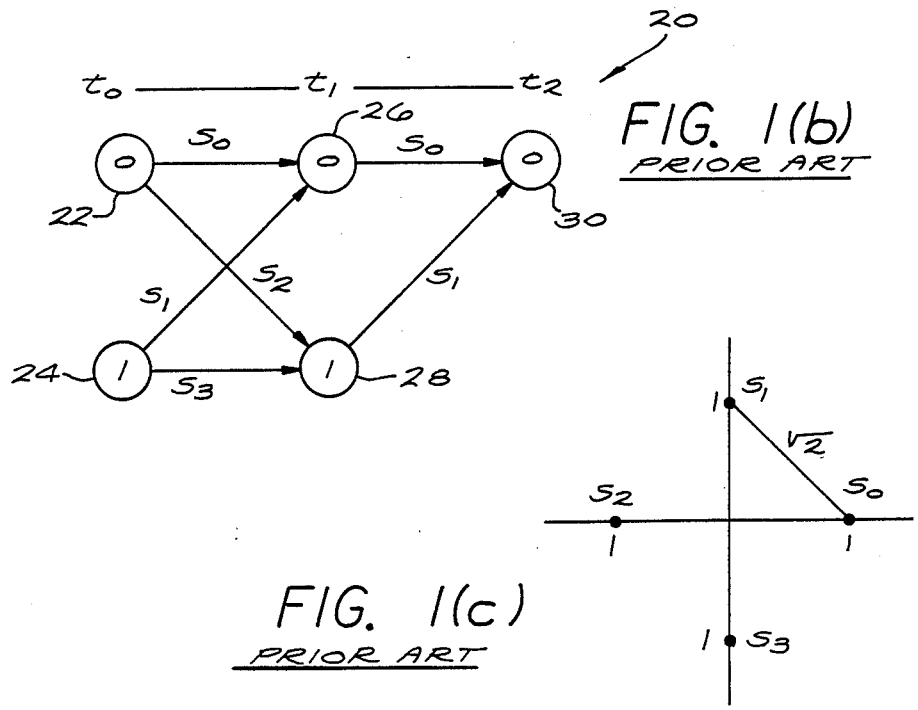
FIG. 1(b) PRIOR ART
FIG. 1(c) PRIOR ART
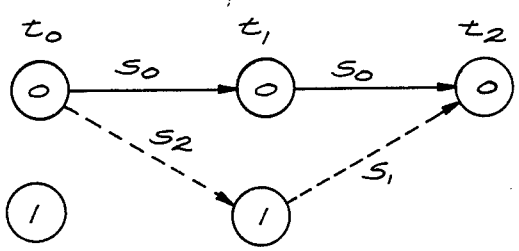
FIG. 1(d)

8 PSK SIGNAL CONSTELLATION

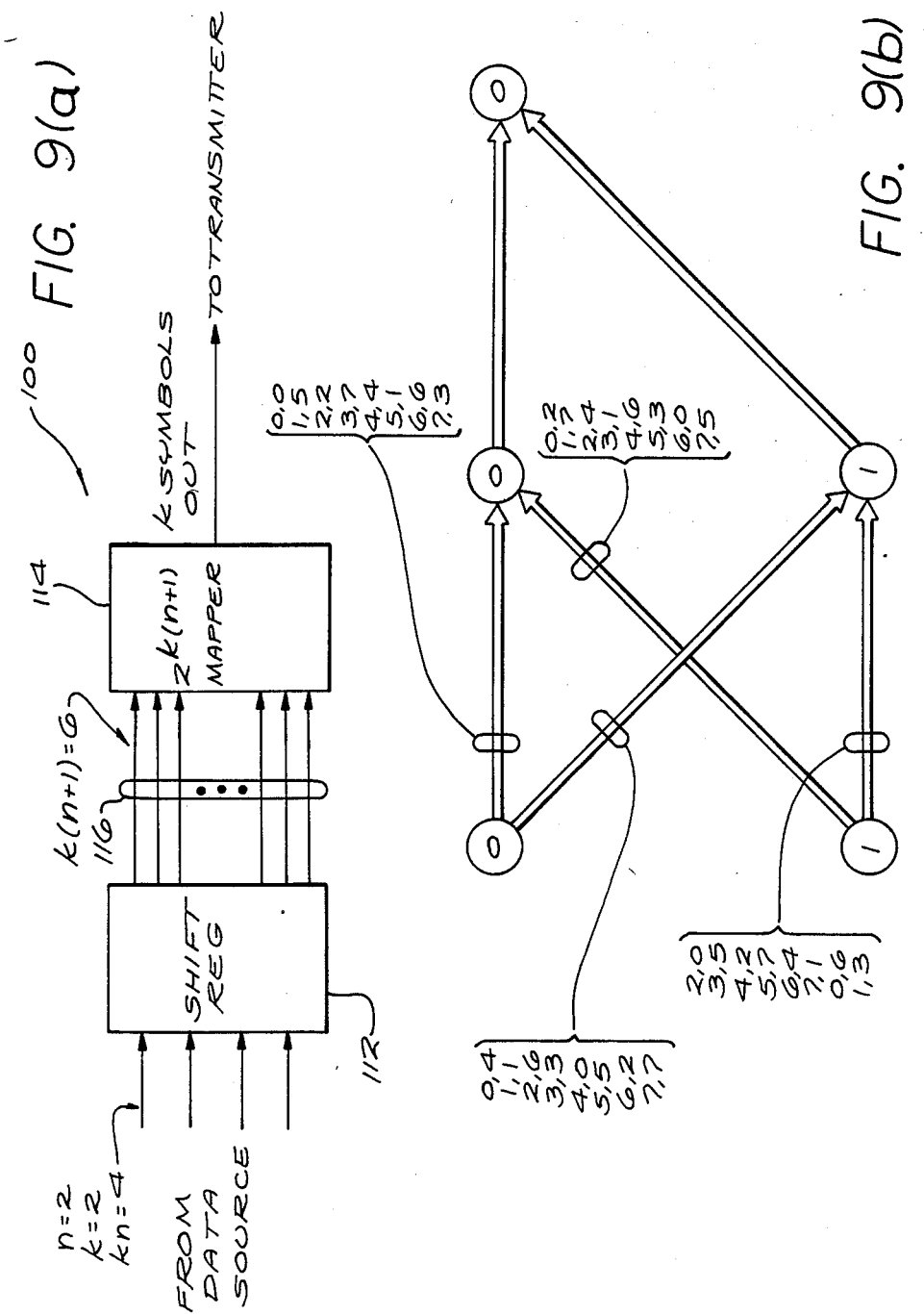

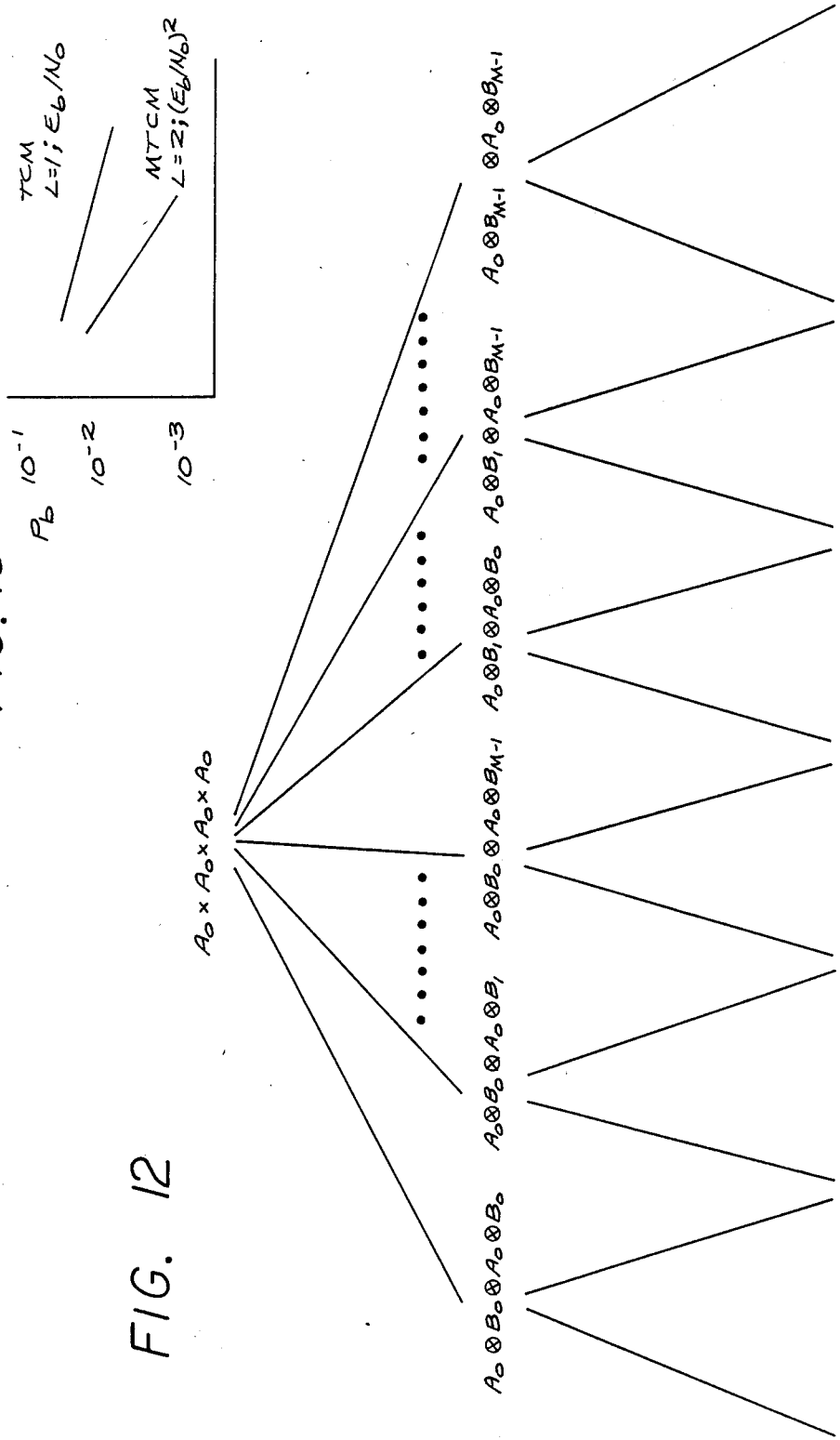

MULTIPLE TRELLIS CODED MODULATION

ORIGIN OF THE INVENTION

The invention described herein was made in the performance of work under a NASA contract, and is subject to the provisions of Public Law 96-517 (35 U.S.C. 202) in which the Contractor has elected to retain title.

BACKGROUND OF THE INVENTION

1. Field of the Invention

The present invention relates to communication systems. More specifically, the present invention relates to modulation schemes utilized in mobile communications systems.

While the present invention is described herein with reference to a particular embodiment for an illustrative application, it is understood that the invention is not limited thereto. Those of ordinary skill in the art having access to the teachings provided herein will recognize additional modifications, applications and embodiments within the scope thereof.

2. Description of the Invention

Mobile communications systems are typified by the movement of a receiver relative to a transmitter or visa versa. The communications link between transmitters and receivers in mobile communications systems is characterized as a fading channel. Mobile satellite communications systems, having a transmitter on a spacecraft and a receiver on a ground based vehicle, cellular telephone systems and terrestrial microwave systems are examples of fading communications systems. A fading channel is a channel which is severely degraded. The degradation is due to numerous effects including multipath fading, severe attenuation due to the receipt via multiple paths of reflections of the transmitted signal off objects and structures in the atmosphere and on the surface. Other effects contributing to the impairment of the faded channel include doppler shift due to the movement of the receiver relative to the transmitter and additive noise.

A need has been recognized for a joint modulation coding scheme which would allow for the effective transmission of data over the faded channel at a desired bit/error rate within a reasonable signal-to-noise ratio. Ideally, the scheme would also provide simultaneously bandwidth efficiency and power efficiency.

As discussed by G. Ungerboeck, in "Channel Coding with Multilevel/Phase Signals", IEEE Transactions on Information Theory, Vol. IT-28, No. 1, January 1982, pp. 55–67, conventional trellis codes have heretofore provided an adequate modulation scheme for Gaussian channels, those characterized by noise only without multipath fading and doppler shift. Conventional trellis coded modulation (TCM) refers to the technique wherein a rate $n/(n+1)$ trellis code is combined (through a suitable mapping function) with an $M = 2^{n+1}$ point signal constellation to produce a coded modulation which has no bandwidth expansion relative to an uncoded $2^n$ point modulation of the same type yet gives significant performance improvement.

Conventional systems have traditionally employed symmetric signal constellations, i.e., those with uniformly spaced signal points. Although symmetric signal constellations are optimum for uncoded systems, the same is not necessarily true for TCM systems. In fact, it has been shown that by designing the signal constellations to be asymmetric, one can, in many instances, obtain a performance gain over the traditional symmetric TCM design. See: (1) "Asymmetric MPSK for Trellis Codes", by D. Divsalar and J. H. Yuen, in GLOBECOM '84 Proceedings, Atlanta, Ga., Nov. 26–29, 1984, pp. 20.6.1–20.6.8; (2) "Combined Trellis Coding with Asymmetric MPSK Modulation", by M. K. Simon and D. Divsalar, in JPL Publication 85-24, Pasadena, Calif., May 1, 1985; and "Trellis Coding with Asymmetric Modulations", by D. Divsalar, M. K. Simon, and J. H. Yuen, published in February 1987 in the IEEE Transactions on Communications.

Performance gain, both in measure and in degree, is, in general, a function of many factors: signal-to-noise ratio (SNR), complexity of the trellis encoder (number of trellis code states), and the number of modulation levels (M). For TCM systems, an asymptotic measure of performance gain is the comparison of the minimum free Euclidean distance $d_{free}$ of the trellis code relative to the minimum distance $d_{min}$ of the uncoded modulation. The term "asymptotic performance gain" refers to the performance gain in the vicinity of the value of energy-to-noise ratio $E_b/N_o$ at which the probability of error $P_b$ becomes very small, i.e., less than $10^{-8}$. This performance measure is an indication of the maximum reduction in required bit energy-to-noise spectral density ratio $E_b/N_o$ with respect to an uncoded system that can be achieved for arbitrarily small system bit error rates. At practical bit error rates, i.e., $10^{-3}$ to $10^{-5}$ this measure can often be misleading since the "real" gain in $E_b/N_o$ reduction due to coding and asymmetry, could be significantly less. More important, however, is the fact that in certain cases of asymmetry, the asymptotic improvement, as measured by $d_{free}$, can only be achieved in the limit as points in the signal constellation merge together, i.e., the trellis code becomes catastrophic. Thus, at some point, conventional trellis coded modulation schemes may not be improved further without the code becoming catastrophic, at which point it would be unable to accurately modulate and demodulate input data.

In the past, trellis codes have been designed for the additive white gaussian noise (AWGN) channel. These codes have been used for systems operating over fading channels although they may not be optimum on these channels. More importantly, it can be shown that most high throughput optimum trellis codes that have been used thus far for the AWGN channel, in particular, those with parallel paths, will either provide no performance gain or provide worse performance gain with respect to an uncoded system.

There is therefore a need in the art for a modulation scheme which would provide performance gains over that obtainable via conventional trellis coded modulation schemes. There is a concomitant need for a criteria by which the performance of the improved scheme may be evaluated and a design procedure, in accordance with the criteria, by which modulation codes and suitable transmitter structures may be generated to satisfy such performance criteria.

SUMMARY OF THE INVENTION

The shortcomings of the related art are addressed by the multiple trellis coded modulation scheme of the present invention. The present invention provides a technique for designing trellis codes to minimize bit error performance for a fading channel. The invention provides a criteria which may be used in the design of such codes which is significantly different from that used for average white Gaussian noise channels.

The method of multiple trellis coded modulation of the present invention comprises the steps of: (a) coding b bits of input data into s intermediate outputs; (b) grouping said s intermediate outputs into k groups of $s_i$ intermediate outputs each where the summation of all $s_i$,s is equal to s and k is equal to at least 2; (c) mapping each of said k groups of intermediate outputs into one of a plurality of symbols in accordance with a plurality of modulation schemes, one for each group such that the first group is mapped in accordance with a first modulation scheme and the second group is mapped in accordance with a second modulation scheme; and (d) outputting each of said symbols to provide k output symbols for each b bits of input data.

BRIEF DESCRIPTION OF THE DRAWINGS

FIG. 1(a) is a block diagram of a conventional trellis code modulation system.

FIG. 1(b) is an illustrative trellis diagram of a conventional trellis code modulation system.

FIG. 1(c) is a signal constellation of a conventional trellis modulation system.

FIG. 1(d) shows the branches of the trellis diagram of FIG. 1(b) used in the calculation of the $d_{free}$.

FIG. 9(a) is another implementation of the multiple trellis code modulation system of the present invention.

FIG. 9(b) is an illustrative multiple trellis diagram for an 8 PSK modulation system.

FIG. 10 shows error probability curves for various intersymbol distance values L corresponding to conventional trellis coding and multiple trellis coding of the present invention.

FIG. 12 is further illustrative of the symbol assignment technique for the multiple trellis coding scheme of the present invention.

DESCRIPTION OF THE INVENTION

Figure 2A:
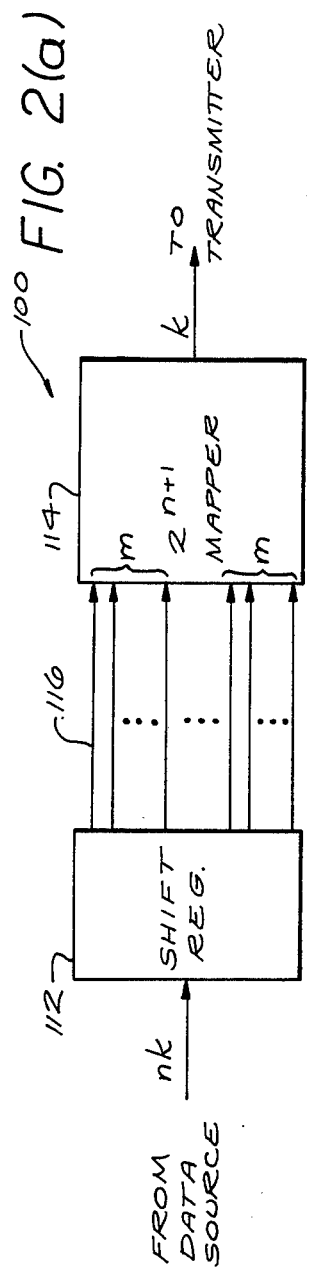
FIG. 2(a) is a block diagram of a multiple trellis code modulation system of the present invention.

The advantages of the multiple trellis coded modulation scheme of the present invention may be appreciated with reference to conventional trellis coded modulation. FIGS. 1a, 1b and 1(c) show a typical conventional trellis encoder, a corresponding conventional trellis diagram, and a corresponding signal constellation respectively. The conventional trellis encoder 10 of FIG. 1 includes one (or several shift) register(s) 12 and a mapper (modulator) 14. The shift register 12 groups n bits of data, input serially or in parallel from a conventional data source (not shown), and provides an intermediate digital output on lines n+1 16 corresponding thereto. The mapper 14 may be implemented with discrete logic or with a read-only-memory (ROM). The mapper 14 translates the signals on lines 16 into symbols in accordance with a symbol assignment which is optimized for a particular communication channel. The symbols output from the mapper 14 are subsequently transmitted by conventional means. Thus, for every n input bits, the conventional encoder 10 provides one output bit and therefore has a throughput of n. The rate of the encoder 10 is n/n+1 where n is an integer, e.g. ½ where n=1.

The performance of the conventional encoder 10 may be modeled by the trellis diagram 20 of FIG. 1(b). For example, for n=1 a two state code, at time $t_o$, the possible states of the shift register 12 are "0" and "1" as indicated at 22 and 24 in the diagram 20. The state of the register 12 is representative of the last bit in the register. Whether the register 12 is in a "0"state or a "1" state (22 or 24), the possible states of the register 12 at time $t_1$ are again "0" and "1" (shown at 26 and 28 respectively). Similarly, state "0" at time $t_2$ is shown at 30. The transitions from a state in one time period to a state in a subsequent time period is represented by a single path which is assigned a symbol. For example, $S_0$ represents a symbol along a transition from a state "0" to a state "0", while $S_2$ represents a symbol along a transition from a "0" to a "1". Similarly, $S_1$ represents a transition from a "1" to a "0", while $S_3$ represents a symbol along a transition from a "1" to a "1". Note that only one path (one output symbol) is provided between states. Note also that the diagram resembles a trellis hence the designation "trellis coded modulation".

FIG. 1(c) represents a symmetric signal constellation for the QPSK modulation scheme depicted in the trellis code of FIG. 1(b). The points in the constellation may represent phase angles in a phase modulation scheme. As mentioned above, the symbol assignments are made, in a manner known in the art, to optimize the distance properties of the code, i.e., to provide optimal performance by minimizing bit error probability for a given bit energy-to-noise ratio $E_b/N_o$ and throughput. For example, an asymptotic measure of the performance gain of the conventional trellis encoder 10 on a channel suffering only from white Gaussian noise is the comparison of the minimum free Euclidean distance $d_{free}$ of the trellis code relative to the minimum distance $d_{min}$ of the uncoded modulation. The performance measure $d_{free}$ is the minimum Euclidean distance between a correct path through the trellis 20 and an error path. This measure reflects the general desirability of increasing the distance of the error path relative to the correct path to facilitate the determination of the correct path. Thus, it is generally desirable to maximize the measure $d_{free}$. The measure $d_{free}$ is calculated by assuming that the input bits are all "0" and comparing the distance between symbols thereof to those corresponding to a minimum nonzero path through the trellis. As mentioned above, the term "asymptotic performance gain" refers to the performance gain in the vicinity of the value of energy-to-noise ratio $E_b/N_o$ at which the probability of error $P_b$ becomes very small. This performance measure is an indication of the maximum reduction in required bit energy-to-noise spectral density ratio $E_b/N_o$ that can be achieved for arbitrarily small system bit error rates.

Thus, for the n=1 conventional trellis encoder of FIGS. 1(a)-(c):

$$d^2_{free} = d^2(0,2) + d^2(0,1) \qquad [1]$$

where d(0,2) is the distance on the signal constellation of FIG. 1(c) between symbols $S_0$ (corresponding to a transition from state "0" to state "0" along the correct path) and $S_2$ (corresponding to a transition from state "0" to state "1" along the error path) between $t_0$ and $t_1$. Similarly, d(0,1) is the distance between symbols $S_0$ again along the correct path and $S_1$ (corresponding to a transition from state "1" to state "0" along the error path) between $t_1$ and $t_2$. FIG. 1(d) shows the trellis 20 with the correct path shown in bold and the error path shown dashed. As shown in the constellation of FIG. 1(c), the distance d(0,2) between symbols $S_0$ and $S_2$ is 2 and the distance d(0,1) between symbols $S_1$ and $S_0$ is $2^{\frac{1}{2}}$ so $d^2_{free} = (2^{\frac{1}{2}})^2 + 2^2 = 2 + 4 = 6$.

Those skilled in the art will recognize that $d_{free}$ may be increased using conventional trellis coded modulation by using a modulation scheme having asymmetric signal points. However, as mentioned above, in certain cases of asymmetry, the asymptotic improvement, as measured by $d_{free}$, can only be achieved in the limit as points in the signal constellation merge together, i.e., the trellis code becomes catastrophic. Code catastrophe occurs when two points in the constellation are brought so close together that the system has difficulty distinguishing between the two. When this occurs, a finite number of bit errors may result in an infinite number of error paths. Thus, at some point, conventional trellis coded modulation schemes may not be improved further without the code becoming catastrophic, i.e., unable to accurately modulate and demodulate input data.

One advantage of multiple trellis coding, as disclosed herein, is that it provides improved performance with symmetric modulations thus avoiding possible code catastrophe. FIG. 2(a) shows a multiple trellis coded modulation (MTCM) system 100 designed in accordance with the teachings of the present invention. The MTCM system 100 includes a shift register 112 and a mapper 114 (modulator). In the simplest case, the system 100 receives nk bits of data from a data source and provides k groups of n+1 intermediate outputs from the shift register 112 on lines 116. The mapper 114 receives the signals on the k groups of lines and outputs to a transmitter (not shown) k symbols one corresponding to each of the k groups of intermediate outputs. That is, the mapper 114 outputs one of $2^{n+1}$ symbols for each of the k groups of n+1 lines. The throughput of the MTCM encoder 100 is nk/k=n, the same as that of the corresponding conventional trellis encoder 10. Thus, one key feature of the invention is that the throughput remains unchanged yet, as discussed below, the performance is improved for a given bit energy-to-noise ratio. Here, as with the conventional encoder 10, the mapper 114 outputs symbols in accordance with a symbol assignment or code that is designed to minimize the probability of bit error $P_b$.

In the more general case, the system 100 of the present invention receives 'b' bits of of data from a data source and provides 's' intermediate outputs from the shift register 112 on lines 116 ('b' and 's' being arbitrary integers with the constraint $b + 1 \leq s$). The 's' intermediate outputs are divided into k groups of $s_i$ symbols each where the summation of the $s_i$,s is equal to s. The mapper 114 receives the signals on the k groups of $s_i$ lines each and outputs to the transmitter k symbols, one corresponding to each of the k groups of intermediate outputs. Thus, the throughput of the MTCM encoder 100 is now b/k which is rational but not necessarily integer.

Figure 2B:
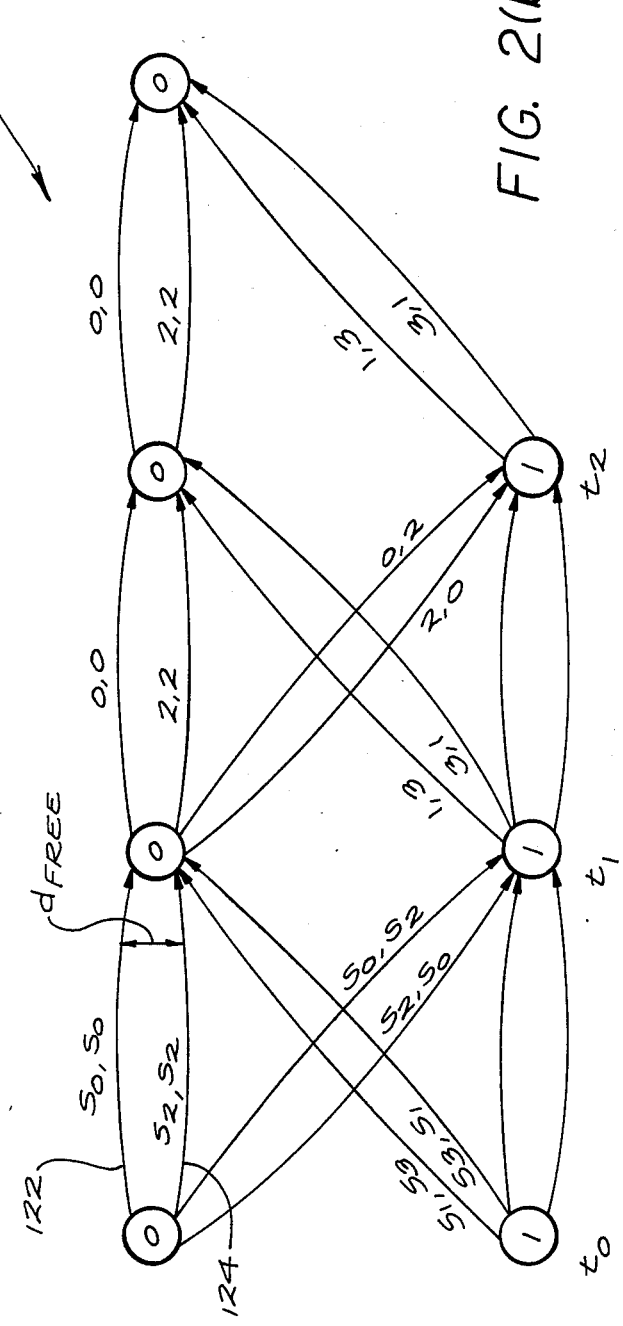
FIG. 2(b) is a multiple trellis diagram in accordance with the principles of the present invention.

The performance of the MTCM encoder 100 corresponding to the simplest case illustrated above, may be modeled by the two-state multiple trellis diagram 120 of FIG. 2(b). In the multiple trellis diagram 120, two transition paths emanate from each state. This reflects that for a two state shift register 112 which groups 2 bits at a time (n=1, k=2, and nk=2), there are two possible paths by which the register 112 may remain in a zero state. A first is via the first path 122 which represents an input of bits 0,0 and the second is via the second path 124 which represents an input of bits 1,0. (The last bit in the register determines the state since the group size is larger than the memory size.) Two symbols are assigned to each path so that no matter which path is taken by the encoder 100, two symbols are output corresponding to k=2. For simplicity, only the subscripts are shown for the symbols after the time period $t_1$.

The signal constellation for the two state MTCM encoder 100 is the same as that shown in FIG. 1(c) for the conventional encoder 10. Hence it is an aspect of the present invention that the constellation is symmetric and unchanged by multiple trellis coding.

Figure 3:
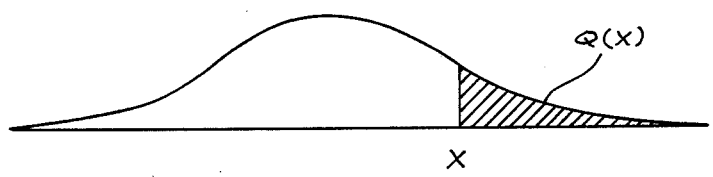
FIG. 3 is a plot of the Gaussian distribution demonstrating the significance of the function Q(x), i.e., the area under the tail of the curve.

Again, the useful white Gaussian noise performance parameter $d_{free}$ is the distance between an all zero path and the shortest error event path. Thus, in this case, $d_{free}$ is equal to the distance between each of the symbols in the first path 122 and each of the symbols in the second path 124. Hence, $d_{free}$ is equal to the distance between $S_0$ and $S_2$ and again between $S_0$ and $S_2$. Since, as shown in FIG. 1(c), the distance between $S_0$ and $S_2$ is 2, $d^2_{free}$ is 8. Thus, for a white Gaussian noise channel, the multiple trellis encoder 100 of the present invention provides a larger $d^2_{free}$ (8) than that (6) provided by the conventional encoder 10 for the same throughput. The improved performance afforded by the present invention is provided by equation [2] below which, for high signal-to-noise ratio, relates the upper bound on the probability of bit error $P_b$ with $d^2_{free}$ and the bit energy-to-noise ratio $E_b/N_o$.

$$P_b \leq n_1 Q[((E_b/4N_o)d^2_{free})^{\frac{1}{2}}] \qquad [2]$$

where $n_1$ is related to the number of paths with $d_{free}$ that exist in the code and $Q(x)$ is a Q function. FIG. 3 illustrates a Q function which for the Gaussian distribution of FIG. 3 decreases as the argument (x) increases where as here x represents the asymptotic variation of the energy-to-noise ratio $E_b/N_o$. Equation [2] reflects that for a white Gaussian noise channel, the important parameters are the bit energy-to-noise ratio $E_b/N_o$ and $d_{free}$. The bit energy-to-noise ratio $E_b/N_o$ is usually given and sets the probability of bit error $P_b$ inversely via the Q function as shown in FIG. 3. The optimum minimum Euclidean distance between the correct path and the error path $d_{free}$, useful for white Gaussian noise channels, is a function of the code design at high bit energy-to-noise ratios. As discussed below, a measure of the number of branches in a path in terms of symbols is used by the present invention for the generally more realistic 'fading' channel.

Figure 4:
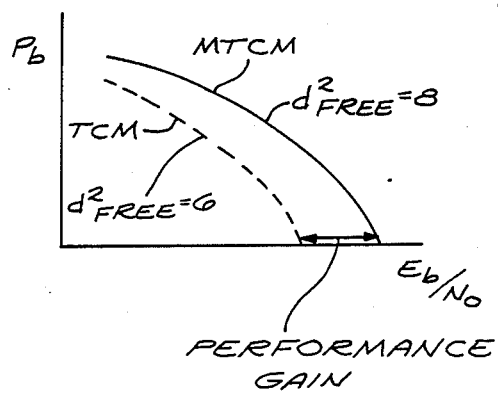
FIG. 4 shows for comparison bit error probability curves for conventional trellis coding and for multiple trellis coding.

FIG. 4 shows curves of the bit error probability $P_b$ for the conventional encoder (dashed) and that for the MTCM encoder of the present invention (bold) as a function of the bit energy-to-noise ratio $E_b/N_o$. Note that the asymptotic performance gain may be as much as 3 db utilizing the principles of the present invention. As is known in the art, the key to achieving optimum performance from any trellis coding scheme is to identify the shortest error event path and to make symbol assignments such that the shortest path dominates the error calculation with respect to any other possible error path. The disclosure of the symbol assignment (code generation) method of the present invention is provided below for both the illustrative Gaussian channel and the fading channel after an initial review of a current symbol assignment technique for a conventional trellis encoder operating on a Gaussian noise channel.

Figure 5B:
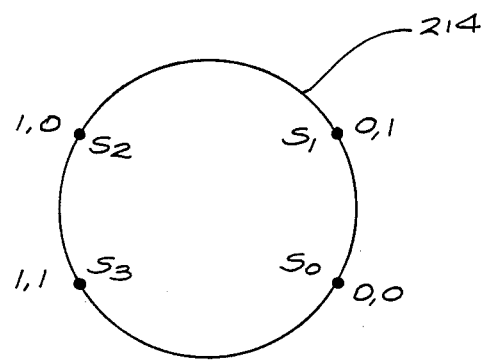
FIG. 5(b) is a signal constellation resulting from a conventional trellis coding symbol assignment using the tree of FIG. 5(a).
Figure 5A:
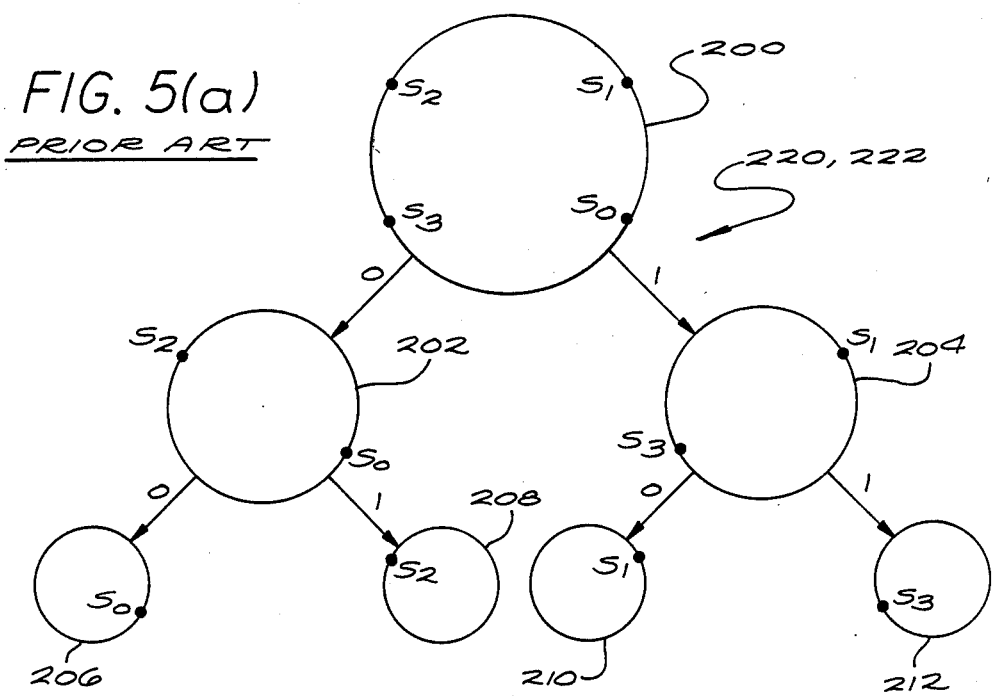
FIG. 5(a) is an assignment tree for symbol assignment in accordance conventional trellis coding schemes.

The symbol assignment technique for a conventional QPSK trellis encoder operating on a Gaussian noise channel is illustrated with reference to the assignment tree of FIG. 5(a). As discussed by Ungerboeck, supra, the trellis code may be generated by partitioning a QPSK signal constellation 200 having four symbol points $S_0$, $S_1$, $S_2$, and $S_3$ into two component subconstellations 202 and 204 having two points each which are at a maximum distance apart relative to each other. Note that the first subconstellation 202 is connected by a logical "0" path to the constellation 200, while the second subconstellation 204 is connected by a logical "1" path. The process is repeated until a number of sets 206, 208, 210 and 212 are provided each having a single point. The symbols assignments are now made by simply finding a particular single point and reading the map backward through the intervening subconstellations to the originating constellation 200 noting the state transitions along the way. Thus, for example, the symbol $S_0$ is assigned a code (0,0) or visa versa, by starting with the sub-subconstellation 206 and noting that the state transitions from the originating constellation 200 were 0 and 0. Similarly, a code of (1,0) is assigned to the symbol $S_2$ by starting with the sub-subconstellation 208 and noting that the state transitions were 1 and 0. The process is repeated until the completed constellation 214 of FIG. 5(b) is achieved.

Figure 6:
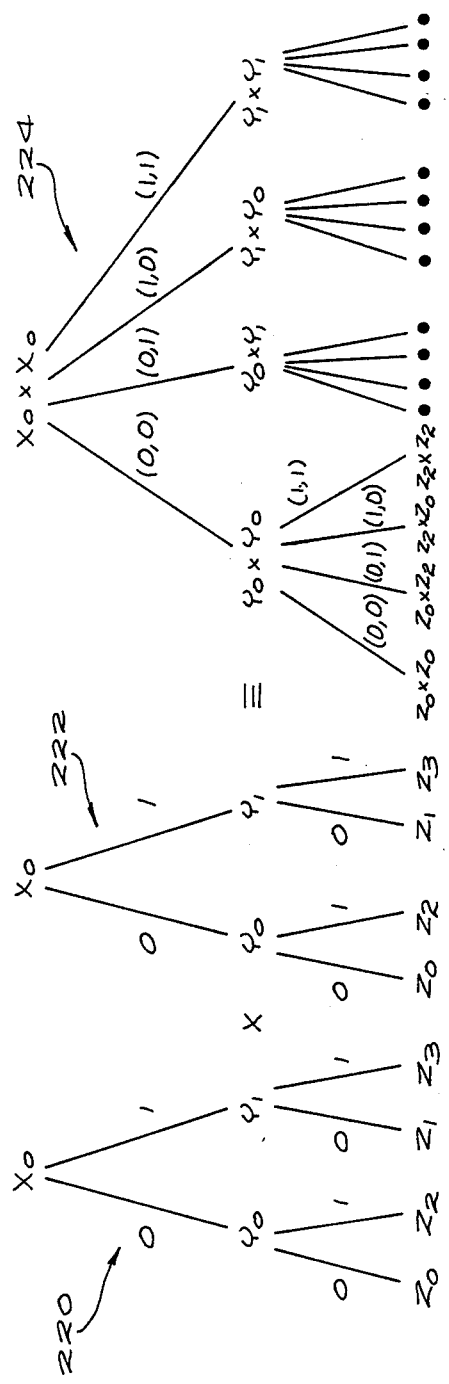
FIG. 6 is illustrative of the cartesian product of two assignment trees in accordance with the symbol assignment technique of the multiple trellis coding scheme of the present invention.

Since multiple transition paths are provided between states in an encoder utilizing the multiple trellis coded modulation technique of the present invention, an alternate symbol assignment technique must be used to generate the code. Such an alternative symbol assignment of the present invention for MTCM on a white Gaussian noise channel is shown in FIG. 6. In FIG. 6, are first and second trees 220 and 222 the cartesian product of which results in the tree 224. Each of the first and second trellis trees 220 and 222 represents the diagram of FIG. 5(a). The constellations 200, 202, 204, 206, 208, 210 and 212 are represented by the symbols $X_0$, $Y_0$, $Y_1$, $Z_0$, $Z_2$, $Z_1$ and $Z_3$ respectively. The diagram of FIG. 5(a) and each of the trees 220 and 224 correspond to k=1, i.e., conventional trellis encoding. A tree 224 by which the MTCM "Simon-Divsalar" codes of the present invention may be generated, corresponding to k=2, is provided by the Cartesian product of the first and second k=1 trees 220 and 222. Again, only the subscripts of the output symbols corresponding to the state transitions are shown. The resulting symbol assignments are shown in the multiple trellis diagram of FIG. 2(b). Those skilled in the art will appreciate that other code generating techniques may be provided within the scope of the invention.

While the Gaussian channel design is illustrative, the fading channel is more representative of the environment for typical mobile communication system applications. As indicated above, the fading channel is a channel which is severely degraded. The degradation is due to numerous effects including multipath fading, severe attenuation due to the receipt of reflections, via multiple paths, of the transmitted signal off of objects and structures in the atmosphere and on the surface. Other effects contributing to the impairment of the faded channel include doppler shift due to the movement of the receiver relative to the transmitter and additive noise.

Two types of multipath fading channels that are known in the art: Rician channels and Rayleigh channels. Rician fading channels are characterized by a strong line-of-sight component, while Rayleigh fading channels have a no line-of-sight component. The channel parameter K relates the power received directly to that received indirectly:

$$K = P_{los}/P_{ref} \quad [3]$$

where $P_{los}$ is the power of the signal received directly along the line-of-sight between a receiver and a transmitter and $P_{ref}$ is the power of the signal received indirectly via reflection, refraction, etc.. Thus, a value of K=0 corresponds to a Rayleigh channel. While the invention is described herein with reference to Rician channels, the invention is not limited thereto.

The design of an MTCM system for the fading channel differs from that of the Gaussian channel set forth above. As with the design of conventional TCM and Gaussian MTCM systems, the first step is to choose a modulation scheme (or schemes for MTCM) based on the power and bandwidth requirements of the application. Next, the code is generated in accordance with a criteria which insures that an optimized symbol assignment has been provided. The code is stored in the memory of the mapper 114 of FIG. 2(a) and used to translate the input bits into output symbols accordingly. The fading channel design procedure differs from the Gaussian channel design procedure in that a different criteria is used to optimize the code and a different technique is used to design the code in accordance with the new criteria.

For the fading channel, the expression of distance for optimizing code depends on the modulation/demodulation technique and the presence or absence of channel state information (CSI). For example, for coherent demodulation of MPSK with ideal CSI, it may be shown that:

$$d^2 = \sum_{n=\eta} \left\{ \underbrace{\frac{|x_n - \hat{x}_n|^2 K}{1 + K + \frac{\bar{E}_s}{4N_o}|x_n - \hat{x}_n|^2}}_{d_{1n}^2} + \underbrace{\left(\frac{\bar{E}_s}{4N_o}\right)^{-1} \ln\left(\frac{1 + K + \frac{\bar{E}_s}{4N_o}|x_n - \hat{x}_n|^2}{1 + K}\right)}_{d_{2n}^2} \right\} \quad [4a]$$

For differentially coherent detection of MPSK with no CSI, it may be shown that:

$$d^2 = \sum_{n=\eta} \left\{ \frac{\frac{1}{2}|x_n - \hat{x}_n|^2 K}{1 + K + \frac{|x_n - \hat{x}_n|^2}{16}\left[2\frac{\bar{E}_s}{N_o} - (HK)\right]} + \left(\frac{\bar{E}_s}{4N_o}\right)^{-1} \ln\left(\frac{1 + K + \frac{|x_n - \hat{x}_n|^2}{16}\left[2\frac{\bar{E}_s}{N_o} - (HK)\right]}{HK}\right) \right\} \quad [4b]$$

In equations [4a] and [4b], $x_n$ is the nth correct symbol, $\hat{x}_n$ represents the nth symbol of the error path, and $\Lambda$ (eta) is the set of all symbols corresponding to $x_n \neq \hat{x}_n$. Also, $\bar{E}_s/N_o$ denotes the symbol energy-to-noise ratio where $\bar{E}_s$ equals $b\bar{E}_b/k$.

Thus, asymptotically, for the Rician channel, the shortest event error path d is the error event path with the smallest number of nonzero distances between itself and the correct path. For this purpose, it is useful to define a parameter L as one which represents the length of the shortest error event path given by the number of nonzero pairwise Euclidean distances between symbols along its branches and those along the correct path. It is to be emphasized that "pairwise distance" refers to the Euclidean distance between corresponding symbols on the pair of paths being compared.

Thus, in terms of the above definitions the average bit error probability, asymptotically at high bit energy-to-noise ratios, is given approximately by:

$$P_b = (C/b)[(1+K)e^{-K/(e_b/N_o)}]^L \quad [5]$$

where $\bar{E}_b/N_o \gg K$, b is the number of bits input to the encoder, and C is a constant that relates to the product of the distances along the path resulting in L and depends on the distance structure of the code. Note that the probability of bit error $P_b$ varies inversely with the bit energy-to-noise ratio $\bar{E}_b/N_o$.

For conventional trellis coding, wherein each branch in the trellis corresponds to a single output channel symbol, the shortest error event path is that error event path with the fewest number of branches having a nonzero pairwise distance from the correct path. For most cases, this also corresponds to the shortest length (in branches) error event and thus L is just the number of branches on this path.

For multiple trellis coding, wherein each branch in the trellis corresponds to more than one output channel symbol, the "length" of the shortest error event path is always equal to or greater than the number of branches along the shortest error event path. In view of equation [5], the possibility of a value of L being greater than the length (in branches) of the shortest error event path is significant and affords multiple trellis coding the opportunity of improving the trellis coding performance on the fading channel. Note that multiplicity alone is not necessarily sufficient to yield optimum performance on the fading channel. Indeed, as discussed below, the code itself must be properly designed.

Figure 7:
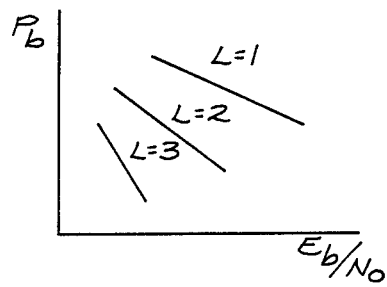
FIG. 7 shows error probability curves for various intersymbol distance values L.

FIG. 7 shows how L may be expected to vary as a logarithmic function of $E_b/N_o$ for the fading channel. (Compare with FIG. 4. which is the logarithmic relationship of $P_b$ to $E_b/N_o$ for the Gaussian channel.)

Thus, equations [4] and [5] provide a design criteria for the fading channel. That is, equation [4] provides a distance measure for the fading channel and equation [5] provides a relationship by which the probability of bit error may be determined.

FIG. 7 and equation [5] illustrate that for the fading channel, it is desirable to maximize the length L. It is also desirable to maximize C which is related to the product of the distances along the path path resulting in L. Thus, in accordance with the design criteria for the fading channel, the code must be designed to maximize the minimum value of the distance parameter d. The advantageous operation of the MTCM technique of the present invention is illustrated by the following example for MPSK modulation.

Figure 8A:
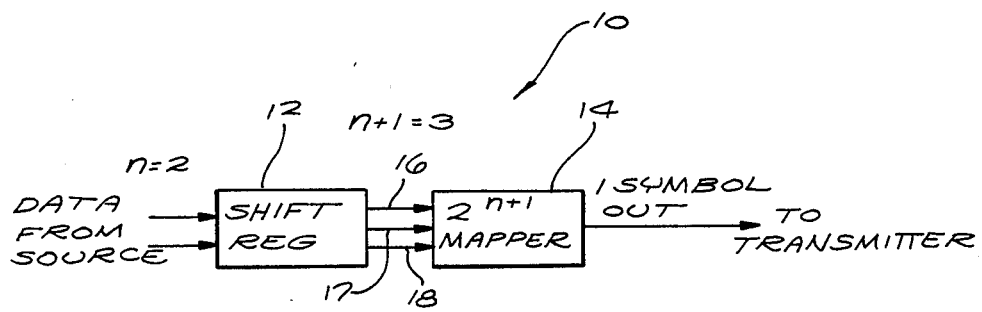
FIG. 8(a) shows another implementation of the conventional trellis code modulator of FIG. 1(a).
Figure 8C:
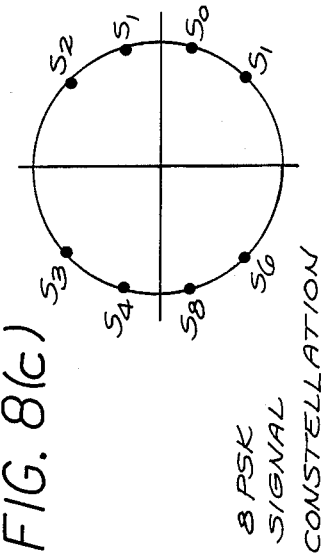
FIG. 8(c) is the signal constellation for an 8 PSK modulation scheme.
Figure 8B:
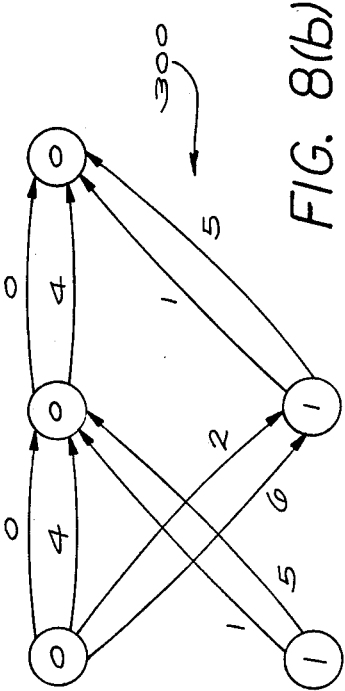
FIG. 8(b) shows another illustrative multiple trellis diagram in accordance with the invention.

FIG. 8(a) shows a conventional trellis encoder 10 in which the shift register 12 receives two inputs and provides three outputs per time period. Hence, it is a rate ⅔ system. Again, the mapper 14 receives the three intermediate outputs and provides one of $2^n$ or $2^3$ output symbols. Since $2^3 = 8$, this is an 8 PSK modulation scheme. See the signal constellation of FIG. 8(c). In sum, this is a rate ⅔, 8 PSK TCM system with a throughput of 2/1 or 2. It outputs one 8 PSK symbol per period. The corresponding trellis diagram 300 with illustrative symbol assignments is shown in FIG. 8(b). Note that parallel transitions are provided between states because the shift register has only one memory location and $2^1 = 2$ states are available per period. Since this is an 8 PSK system, there are eight possible output symbols per period. With two states (n=2), there must be $2^n$ or 4 branches emanating from each state, each with a unique symbol assignment. With four branches from each state going to a total of two states, there must be two parallel branches between one state and another.

Note that the shortest path length in terms of symbols between a transmitted correct path of all zeros and the shortest event error path, i.e., the path with the fewest number of branches, (remerging to the zero path) is L=1 because the shortest path is only 1 branch. Here, L is the length in terms of symbols of the shortest error path and since the number of symbols on a branch is the same as the number of branches along the error path L in this case is equal to the number of branches along the shortest error path. Since for this example, C/b=¼, the bit error probability $P_b$ may be found by equation [5] to be:

$$P_b \leq (\tfrac{1}{4})[(1+K)/(E_b/N_o)]e^{-K}$$

Assuming K=0, $$P_b \leq \tfrac{1}{4}(E_b/N_o)$$

Thus, the bit error probability $P_b$ varies inversely with the bit energy to noise ratio $E_b/N_o$. Assuming further that $E_b/N_o$ is approximately 100, the upper bound on the bit error probability is $(0.25) \times 10^{-2}$.

The performance improvement afforded by the MTCM scheme of the present invention is illustrated by considering the MTCM system 100 of FIG. 9(a). FIG. 9(a) shows a multiple (k=2) trellis encoder 100 which is equivalent with respect to rate and throughput to the conventional trellis encoder of FIG. 8(a). Here, 4 input bits are grouped by the shift register 112 to provide two groups (k=2) of three intermediate outputs on lines 116. Hence, the rate is still 4/6 or 2/3. The mapper provides one of $2^{n+1}$ outputs for each group of intermediate outputs. As there are two groups of intermediate outputs corresponding to k=2, the mapper outputs two symbols per period out of a total of $2^{k(n+1)}$, in this case 64, total symbol pairs. Thus, the throughput of the system 100 is still 4/2 or 2.

FIG. 9(b) shows a multiple trellis diagram for the two state, rate ⅔, k=2, throughput 2, 8 PSK, MTCM system of FIG. 9(a). Since the number of inputs is now 4, there must be $2^4$ or 16 branches emanating from each state. As this is a two state system, there are now eight parallel branches per state. Thus, each heavy line in FIG. 9(b) represents eight parallel branches. The symbol assignments are shown for each of the eight branches. Note that within each set of eight parallel branches, the symbol assignments differ from each other in two positions, i.e. 0 and 1 and 0 and 5, and 1 and 2 and 5 and 2, and etc. For the MTCM system of FIG. 9(a), the symbols have been assigned so that each symbol of the set of parallel branches differs from the correct path of 0,0 in two positions by a nonzero amount. Hence, for the MTCM system of FIG. 9(a), the length L of the shortest event error path is 2 as compared to L=1 for the corresponding TCM system of FIG. 8(a). The bit error probability now has an upper bound which varies as $\tfrac{1}{2}(E_b/N_o)^2$. Using the same assumptions and values used for the TCM system 10 of FIG. 8(a) yields a $P_b \leq 0.5 \times 10^{-4}$ or 1/20,000 versus 1/400 for the conventional trellis coding scheme. This is illustrated in FIG. 10.

Clearly, the proper symbol assignment is necessary to optimize the performance of the system 100. Accordingly, the coding scheme of the present invention for optimum performance on the Rician fading channel is as follows. Assume k=2. Let $A_0$ denote the complete MPSK signal set (i.e., signal points 0, 1, 2, ... M−1) and $A_0A_0$ denote a 2-fold Cartesian product of $A_0$ with itself. Thus, an element of the set $A_0A_0$ is a 2-tuple whose first and second symbols are each chosen from the set $A_0$. The first step is to partition $A_0A_0$ into M signal sets defined by the ordered Cartesian product $A_0B_i$; where i=0, 1, 2, ... M−1; the jth element is defined by nj+i where j=0, 1, 2, ..., M−1; and the addition is performed modulo M. (In this context, the term "ordered Cartesian product" refers to the concatenation of corresponding elements in the two sets forming the product.) Thus, the jth 2-tuple from the product $A_0B_i$ is the ordered pair (j,nj+i). The selection of the odd integer multiplier n is the key to the set partitioning method. Before presenting the relation whose solution provides the desired value(s) of n, it is illustrative to first consider the purpose of the first partitioning step.

The first partitioning step accomplishes two purposes. First it operates to insure that within any of the M partitions, each of the two symbol positions has distinct elements. That is, for any 2-tuple within a partitioned set, the Euclidean distance of each of the two symbols from the corresponding symbols in any other 2-tuple within the same set is nonzero. Stated alternatively, if the shortest error path is of length 1 branch (i.e., parallel paths exist in the trellis and have the smallest Euclidean distance from the correct path), then the length L of this path will have a value 2 and the error probability performance on the fading channel will vary as the inverse square of $E_b/N_o$ as shown above.

Secondly, the first partitioning step maximizes the minimum Euclidean distance product between 2-tuples within a partitioned set, i.e., the minimum of the product of the distances between corresponding symbol positions of all pairs of 2-tuples, is maximized. To determine the value of this distance, note that the set $B_i+1$ is merely a cyclic shift of the set $B_i$, i.e., a clockwise rotation of the corresponding signal points by an angle 2(pi)/M. Thus, since the squared Euclidean distance between a pair of 2-tuples is the sum of the squared Euclidean distances between corresponding symbols in the 2-tuples, the above set partitioning operates to insure that the intradistance structure of all of the partitions $A_0 B_i$ are identical. Thus, it is sufficiently illustrative to examine the distance structure of $A_0 B_0$, henceforth called the "generating set". For this set, the product of the squared distances between the ith 2-tuple and the jth 2-tuple is:

$$\pi d_{ij}^2 = \left(4\sin^2\left(\frac{(j-i)\pi}{M}\right)\right)\left(4\sin^2\left(\frac{n(j-i)\pi}{M}\right)\right) \quad [6]$$

Thus, based on the above requirement, n should be chosen such that the minimum of over all pairs of 2-tuples in $A_0 B_0$ is maximized. Making use of the symmetry properties of the MPSK signaling set around the circle, the above can be written as follows. Letting n* denote the desired value(s) of n, then n* has the maximum solution(s):

$$f(n^*) = \underset{n^* = 1,3,5,\ldots,m/2-1}{\text{MAX}} \underset{m = 1,2,\ldots,m/2-1}{\text{MIN}} 16 \sin^2\left(\frac{m\pi}{M}\right)\sin^2\left(\frac{n^*m\pi}{M}\right) \quad [7a]$$

Equation [7a] has the equivalent vector form:

$$g(n^*) = \underset{n^* = 1,3,5,\ldots,m/2-1}{\text{MAX}} \underset{m = 1,2,\ldots,m/2-1}{\text{MIN}} |z^m - 1|^2 |z^{n^*m} - 1|^2 \quad [7b]$$

where $z = \exp(j2(pi)/M)$ represents a unit vector with phase equal to that between adjacent points in the signal constellation. For $M=2$, the degenerate solution $n^*=1$ exists.

Note that the additive inverse(s) of $n^*$, i.e., $M-n^*$ is (are) also valid solutions. This conclusion is easily derived by substituting $z^{M-n} = \exp(j2(pi)(M-n)/M) = z^{-n}$ for $z^n$ in equation [7b] and observing that the equation is unchanged. Table I below provides the solutions of equation [7b] for $M=4, 8, 16, 32,$ and $64$.

TABLE 1

| M | $n^*$ |
|---|---|
| 2 | 1,1 |
| 4 | 1,3 |
| 8 | 3,5 |
| 16 | 7,9 |
| 32 | 7,9,23,25 |
| 64 | 19,27,37,45 |

The sets obtained by this first partition are illustrated in Table 2 below for the case $M=8$ and $n^*=3$, which is the single solution to equation [7]. (Note that the additive inverse $n^*=5$ could also have been used to generate the sets below in Table 2 below

TABLE 2

|   |   |   |   |   |   |   |   |
|---|---|---|---|---|---|---|---|
|   | 0 0 |   | 0 1 |   | 0 2 |   | 0 3 |
|   | 1 3 |   | 1 4 |   | 1 5 |   | 1 6 |
|   | 2 6 |   | 2 7 |   | 2 0 |   | 2 1 |
| $A_0\ B_0 =$ | 3 1 | $A_0\ B_1 =$ | 3 2 | $A_0\ B_2 =$ | 3 3 | $A_0\ B_3 =$ | 3 4 |
|   | 4 4 |   | 4 5 |   | 4 6 |   | 4 7 |
|   | 5 7 |   | 5 0 |   | 5 1 |   | 5 2 |
|   | 6 2 |   | 6 3 |   | 6 4 |   | 6 5 |
|   | 7 5 |   | 7 6 |   | 7 7 |   | 7 0 |
|   | 0 4 |   | 0 5 |   | 0 6 |   | 0 7 |
|   | 1 7 |   | 1 0 |   | 1 1 |   | 1 2 |
|   | 2 2 |   | 2 3 |   | 2 4 |   | 2 5 |
| $A_0\ B_4 =$ | 3 5 | $A_0\ B_5 =$ | 3 6 | $A_0\ B_6 =$ | 3 7 | $A_0\ B_7 =$ | 3 0 |
|   | 4 0 |   | 4 1 |   | 4 2 |   | 4 3 |
|   | 5 3 |   | 5 4 |   | 5 5 |   | 5 6 |
|   | 6 6 |   | 6 7 |   | 6 0 |   | 6 1 |
|   | 7 1 |   | 7 2 |   | 7 3 |   | 7 4 |

The resulting sets (of dimensionality $M/2$) should have an intradistance product structure equal to that which would be achieved by a first level partitioning in accordance with equation [7] with, however, $M$ replaced by $M/2$. Interestingly enough, this second level of set partitioning can still be achieved by an odd-even split of a first level partitioning such as that previously described; however, the value of $n^*$ used to generate the sets on this first level should be that corresponding to the solution of equation [7] with $M$ replaced by $M/2$ (or its additive inverse). Note that if one of the solutions of equation [7] (including the additive inverse) is equal to one of the solutions of equation [7] (again including additive inverses) when $M$ is replaced by $M/2$, then indeed the first two levels of set partitioning follow a tree structure. By inspection of Table 1, we observe that when $M=4, 8,$ and $32$, there exists a value of $n^*$ common to these values of $M$ and the corresponding values of $M/2$. Thus, for $M=4, 8,$ and $32$ the first two levels of set partitioning follow a tree structure whereas, for $M=16$, they do not.

Figure 11:
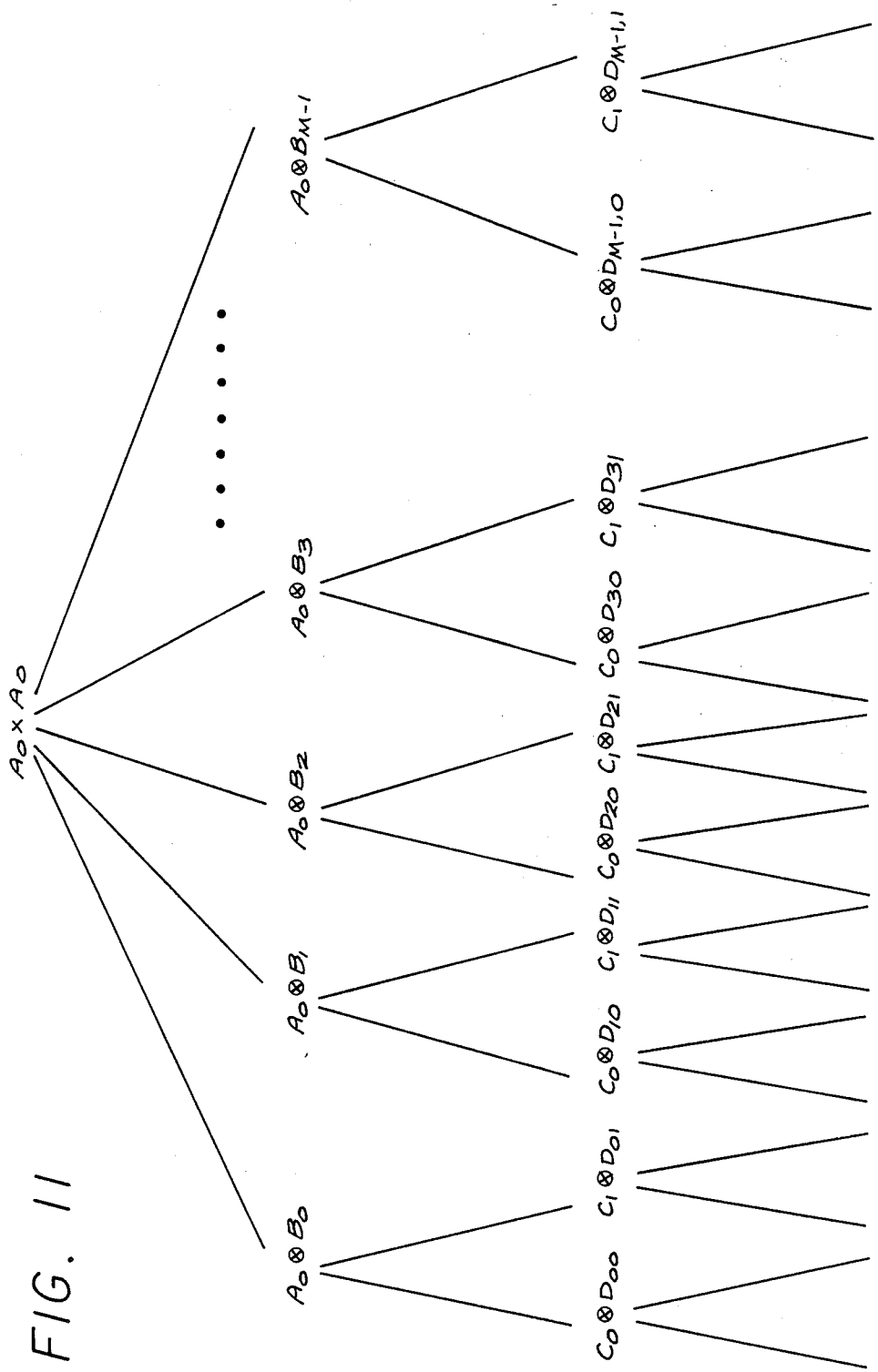
FIG. 11 illustrates the symbol assignment technique for the multiple trellis coding scheme of the present invention.

As an example of the second level of set partitioning, the sets that result from the partitioning of the sets in Table 3 are given below and the corresponding tree structure is illustrated in FIG. 11.

TABLE 3

|   |   |   |   |   |   |   |   |   |
|---|---|---|---|---|---|---|---|---|
|   |   | 0 0 |   | 1 3 |   | 0 1 |   | 1 4 |
| $C_0$ | $D_{00} =$ | 2 6 | $C_0$ $D_{01} =$ | 3 1 | $C_0$ $D_{10} =$ | 2 7 | $C_0$ $D_{11} =$ | 3 2 |
|   |   | 4 4 |   | 5 7 |   | 4 5 |   | 5 0 |
|   |   | 6 2 |   | 7 5 |   | 6 3 |   | 7 6 |
|   |   | 0 2 |   | 1 5 |   | 0 3 |   | 1 6 |
| $C_0$ | $D_{20} =$ | 2 0 | $C_0$ $D_{21} =$ | 3 3 | $C_0$ $D_{30} =$ | 2 1 | $C_0$ $D_{31} =$ | 3 4 |
|   |   | 4 6 |   | 5 1 |   | 4 7 |   | 5 2 |
|   |   | 6 4 |   | 7 7 |   | 6 5 |   | 7 0 |
|   |   | 0 4 |   | 1 7 |   | 0 5 |   | 1 0 |
| $C_0$ | $D_{40} =$ | 2 2 | $C_0$ $D_{41} =$ | 3 5 | $C_0$ $D_{50} =$ | 2 3 | $C_0$ $D_{51} =$ | 3 6 |
|   |   | 4 0 |   | 5 3 |   | 4 1 |   | 5 4 |
|   |   | 6 6 |   | 7 1 |   | 6 7 |   | 7 2 |
|   |   | 0 6 |   | 1 1 |   | 0 7 |   | 1 2 |
| $C_0$ | $D_{60} =$ | 2 4 | $C_0$ $D_{61} =$ | 3 3 | $C_0$ $D_{70} =$ | 2 5 | $C_0$ $D_{71}$ 32 | 3 0 |
|   |   | 4 2 |   | 5 5 |   | 4 3 |   | 5 6 |
|   |   | 6 0 |   | 7 3 |   | 6 1 |   | 7 4 |

The third and succeeding steps are identical in construction to the second step, namely, each set is partitioned on the present level into two sets containing the alternate rows with the sets for the present level determined by a value of $n^*$ computed from equation [7] with $M$ successively replaced by $M/4, M/8,$ etc.

To extend the procedure to higher multiplicity factors i.e., greater than 2, simply requires the formation of the $k/2$-fold ordered Cartesian product of all the sets on a given partition level created by the procedure for $k=2$. The result of this procedure is illustrated in FIG. 12 for $k=4$. If the number of sets required to satisfy the trellis is less than the number of sets generated on a particular partition level, then one would choose those that have largest interdistance as was the case in the example of FIG. 9(b). Also, as for the $k=2$ case, the sets formed by this generalized set partitioning procedure will all have distinct elements in any of the $k$ symbol positions. Thus, the length of a 1 branch error event path will have value $k$, and hence the asymptotic bit error rate performance of such a trellis code on the fading channel will vary inversely with $(E_b/N_o)^n$ with $n \geq k$. Thus it can be concluded that in so far as the rate of decay of average bit error probability with $E_b/N_o$, incorporating multiplicity in the design of the trellis code has a similar effect to using diversity, a technique known to those skilled in the art to improve performance on fading channels. However, we should note that using space diversity may be more costly than using MTCM. Also, MTCM can be expected to yield superior performance to time and frequency diversity.

A more optimum procedure for $k \geq 2$ would be to generalize equation [7] to $$g(n^*_1, n^*_2, \ldots, n^*_{k-1}) = \underset{n^*_1,n^*_2,\ldots,n^*_{k-1} = 1,3,5\ldots,m/2 - 1}{\text{MAX}} \underset{m = 0,1,2,\ldots,m/2 - 1}{\text{MIN}} |z^m - 1|^2 \overset{b-1}{\underset{i=1}{\pi}} |z^{n^*_i m} - 1|^2 \qquad [8]$$

The set of maximum solutions $n^*_1, n^*_2, \ldots, n^*_{k-1}$, can be used to produce all of the necessary sets on any level of partition.

Figure 13:
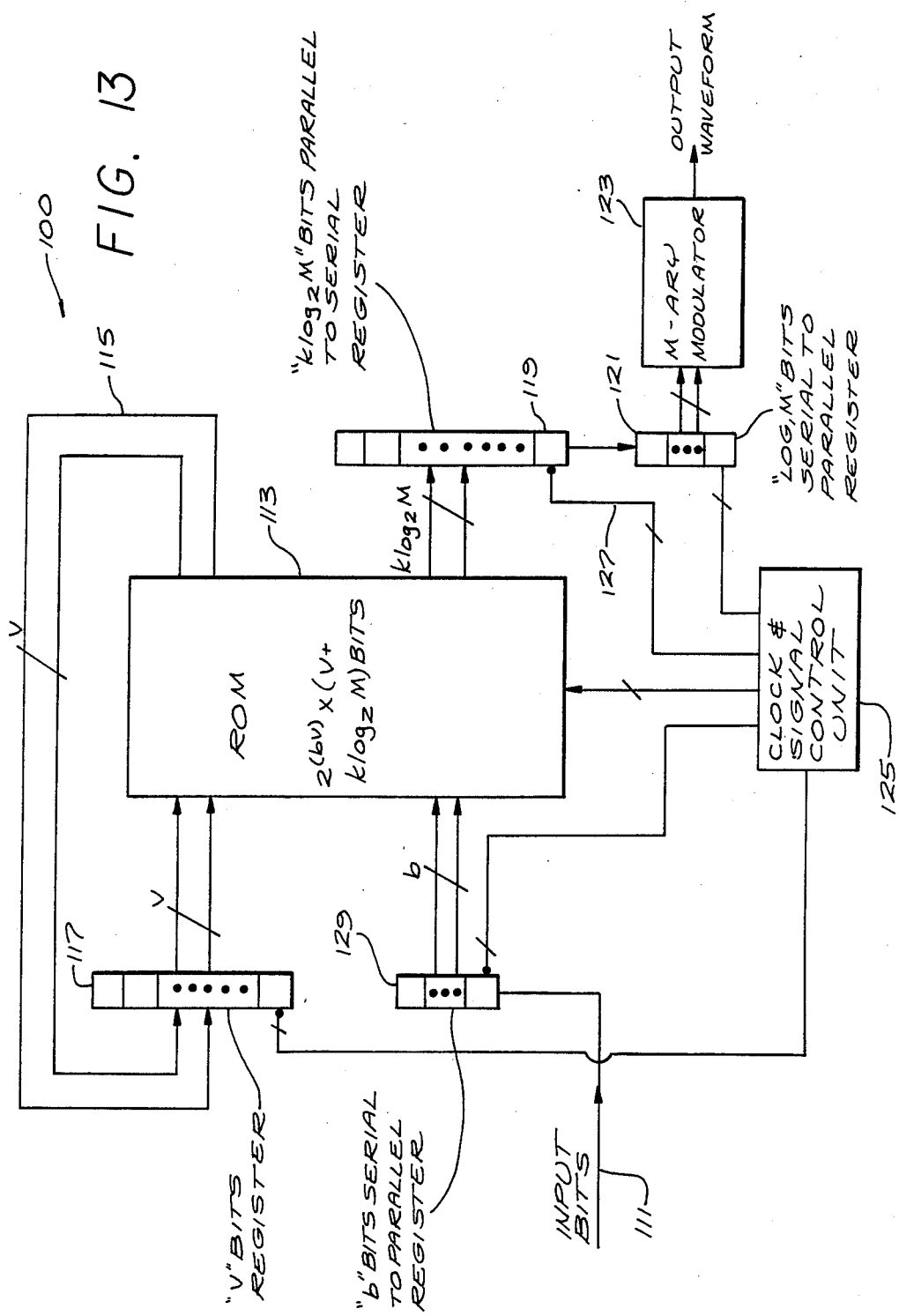
FIG. 13 shows an illustrative implementation of the multiple trellis code modulator of the present invention.

An illustrative implementation of the multiple trellis encoder 100 of the present invention is shown in FIG. 13. FIG. 13 shows the implementation 100 of MTCM with a ROM 113 for any b input, k output, memory nu ($2^{nu}$ states) encoder with an M-ary modulator 123. The ROM 113 is programmed to provide the desired symbol assignments along the transition branches. Every b serial input bits on line 111 are converted to b parallel bits entering the ROM 113 using the first register 129. The outputs of the ROM 113 are $nu + k\log_2 M$ parallel bits. (For hybrid modulation, the number of output bits is:

$$\nu + \sum_{i=1}^{K} \log_2 M_i \qquad [9]$$

for $M_i$-ary modulation at the ith period, $i = 1, 2, \ldots k$. The ($\nu$) nu bits through the feedback loop 115 enters a nu bit register 117. The nu output bits of the register 117 enters the ROM 113. The $k\log_2 M$ output bits (or $\log_2 M_i$) bits of the ROM 113 enters the register 119 in parallel. For every clock pulse on line 127 $\log_2 M$ bits or ($\log_2 M_i$ parallel bits) leaves the register 119 serially and enters the register 121 which will be converted to $\log_2 M$ (or $\log_2 M_i$) parallel bits and are assigned to one of M-ary modulation levels (or $M_i$-ary modulation levels) and the corresponding signal represents the output. Thus k such outputs per b bits input to the encoder 100 results.

Figure 14:
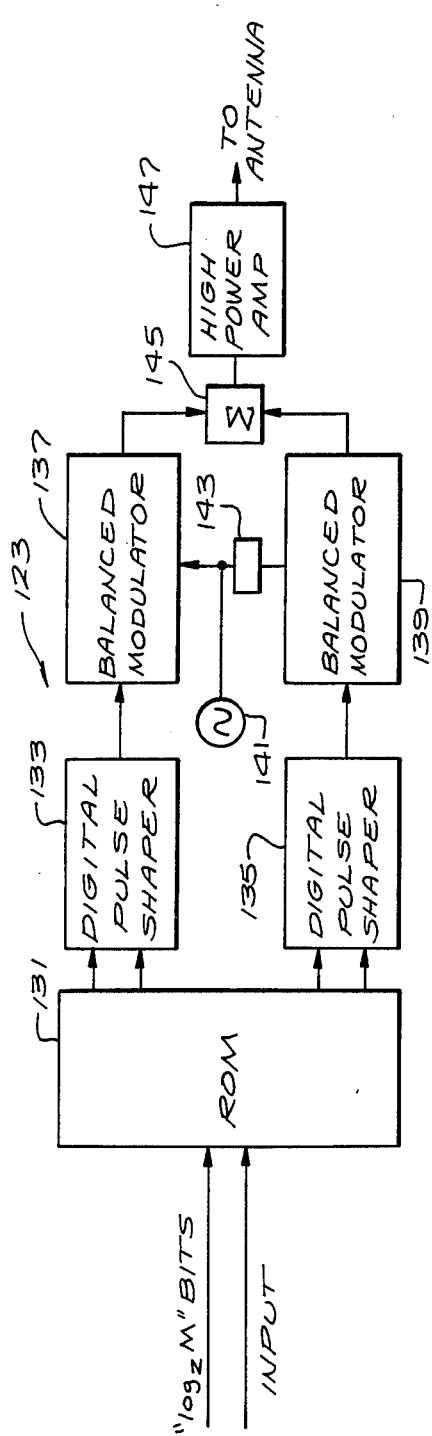
FIG. 14 shows an illustrative implementation of the M-ary modulator of the multiple trellis code modulator of the present invention.

An illustrative implementation of the M-ary modulator is shown in FIG. 14. The output of the register 121 of FIG. 14 is input to a ROM 131 which generates I an Q signals each containing $\log_2(M/2)$ bits. These I and Q bit streams are input to identical digital pulse shapers 133 and 135 whose outputs modulate quadrature I and Q carriers using balanced modulators 137 and 139. The I and Q modulated carriers are summed by the summer 145 and provided to a high power amplifier 147. The output of the amplifier 147 is provide to a transmitter antenna (not shown).

Figure 15:
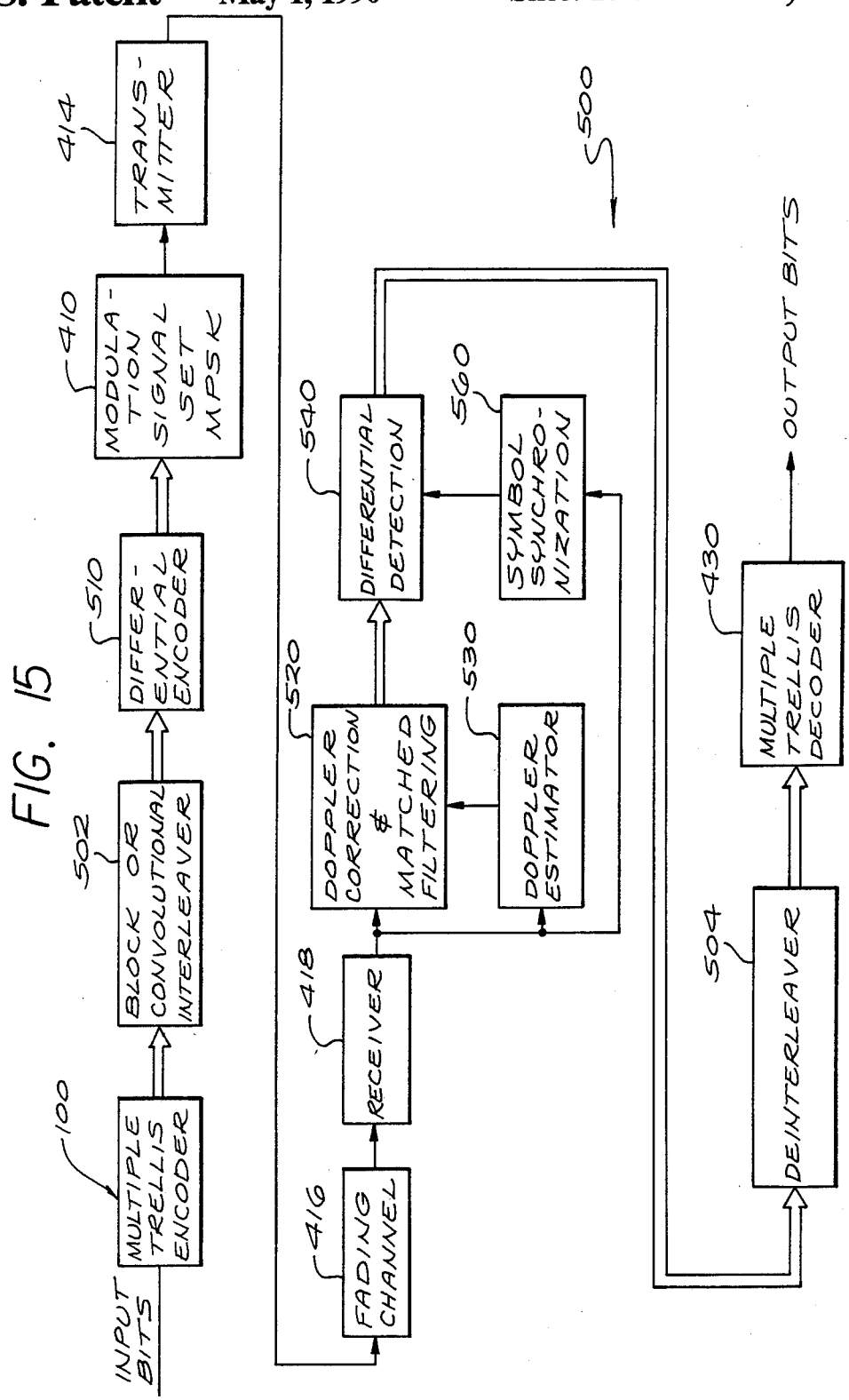
FIGS. 15 and 16 show illustrative system applications using the multiple trellis coding modulation system of the present invention.
Figure 16:
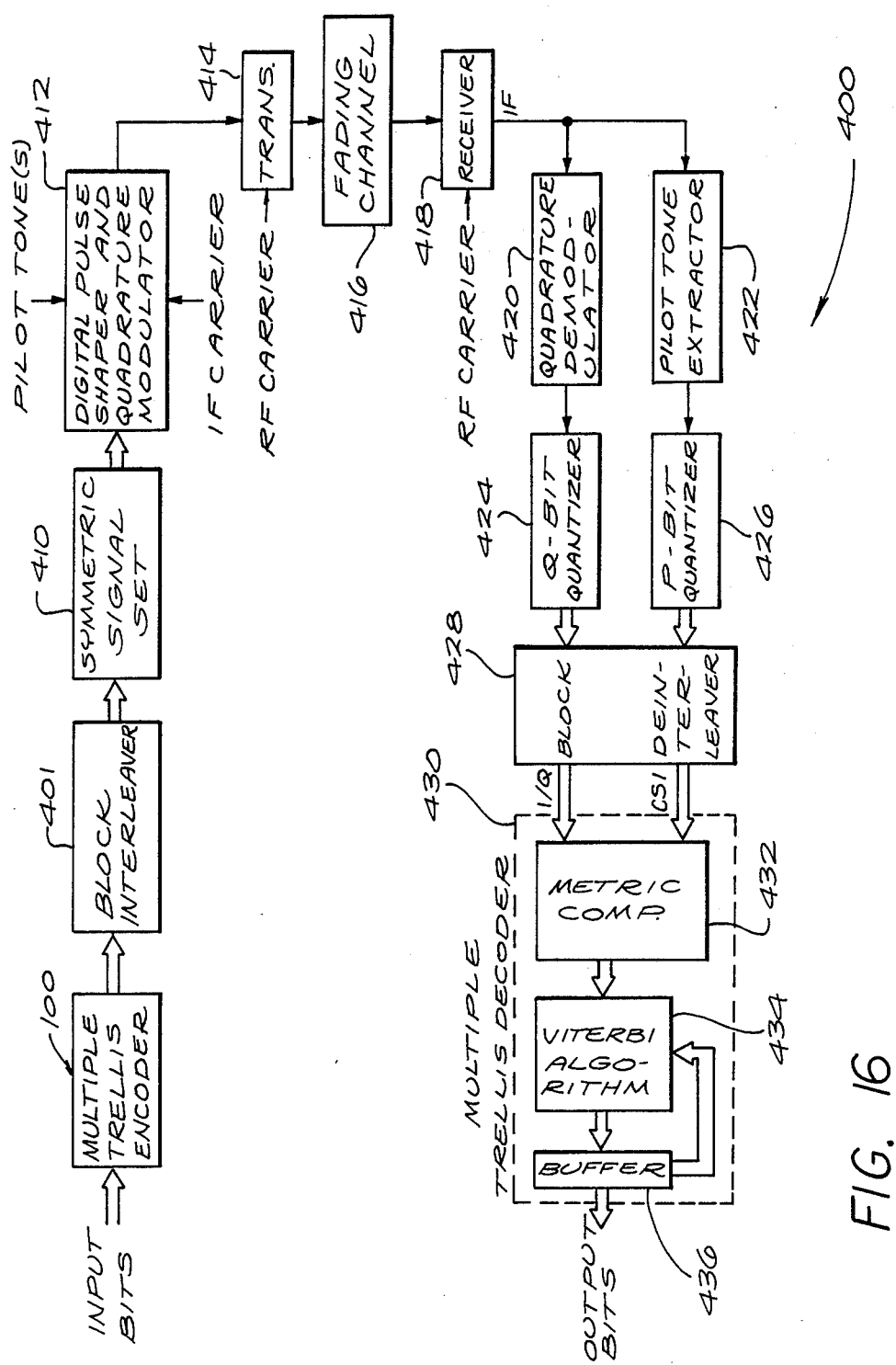

FIGS. 15 and 16 shows the multiple trellis encoder 100 of the present invention in illustrative system applications of a mobile satellite communications system 400. FIG. 15, for example, illustrates the use of an MTCM modulator 100 with differential detector 540 for mobile satellite communications. A block or convolutional interleaver 502 with a corresponding deinterleaver 504 are used to disperse received faded samples to aid the multiple trellis decoder in the correction of the faded bits. The MPSK symbols are input to a differential encoder 510 and transmitted through a transmitter 414 through the fading channel 416. (The fading channel box represents a satellite channel with fading and additive white Gaussian noise. The receiver 418 receives and downconverts the rf signal and provides it to the doppler estimator 530, doppler correction and matched filtering 520 and symbol synchronizer 560. The output of the matched filter 520 is provided to the differential detector 540. The output of the differential detector 540 is deinterleaved by the deinterleaver 504 and is provided to the multiple trellis decoder 430 which can be implemented using a Viterbi algorithm. A similar description applies to the system of FIG. 16.

Figure 17:
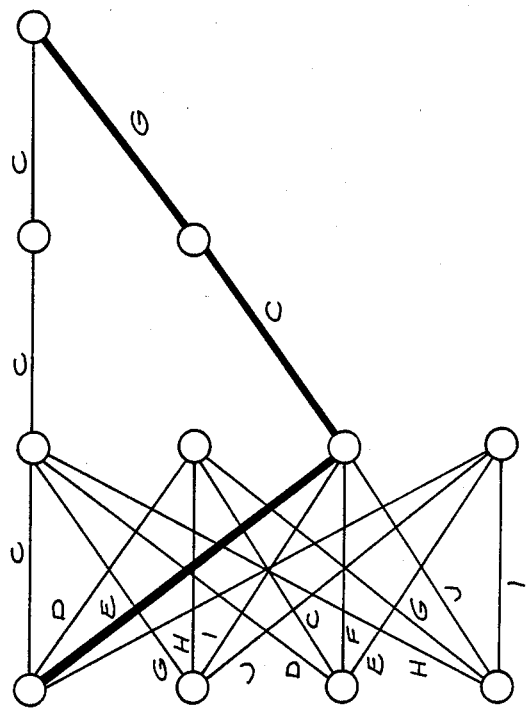
FIG. 17 shows an illustrate multiple trellis diagram for an illustrative hybrid QPSK/8PSK modulation scheme in accordance with the present invention.

Thus, the present invention has been described herein with reference to a particular embodiment for a particular application. The present invention features improved performance at the same rate and throughput of a corresponding TCM system with unity bandwidth expansion. In addition, the present invention allows for more flexibility in that noninteger throughput systems may be devised using the principles disclosed herein. Moreover, the intermediate outputs may be grouped to provide various diverse modulation schemes as illustrated in FIG. 17. FIG. 17 shows a 4 state trellis for a rate 4/5 hybrid QPSK/BPSK multiple TCM system.

Those of ordinary skill in the art will recognize additional modifications, applications and embodiments within the scope thereof. For example, while the present invention has been described with reference to an encoder for transmission, those skilled in the art will appreciate that the principles of the invention may be applied to decoders such as those used in receivers without departing from the scope of the invention.

It is intended by the appended claims to cover any and all such modifications, applications and embodiments within the scope of the invention.

Accordingly,
What is claimed is:

1. The method of multiple trellis coded modulation comprising the steps of:
   (a) coding b bits of input data into s intermediate outputs;
   (b) grouping said s intermediate outputs into k groups of $s_i$ intermediate outputs each where the summation of all $s_i$'s is equal to s and k is equal to at least 2;
   (c) mapping each of said k groups of intermediate outputs into one of a plurality of symbols in accordance with a plurality of modulation schemes, one for each group such that the first group is mapped in accordance with a first modulation scheme and the second group is mapped in accordance with a second modulation scheme; and
   (d) outputting each of said symbols to provide k output symbols for each b bits of input data.

2. The method of claim 1 including the step of assigning a plurality of said symbols to each of said k groups of intermediate outputs in response to the signals provided thereby.

3. The method of claim 2 wherein said grouping step includes the step of storing said b input bits in a memory having at least two states.

4. The method of claim 3 wherein the step of assigning a plurality of symbols to each of said k groups of intermediate outputs includes the step of assigning said symbols to minimize the probability of bit error associated therewith by maximizing the free Euclidean distance thereof.

5. The method of claim 4 wherein the step of assigning symbols to each of said k groups of intermediate outputs includes the steps of:
   (a) providing a first assignment tree representative of symbol assignments for $k = 1$ and (b) taking the k-fold cartesian product of said assignment tree with itself to provide said plurality of symbols for each of said k groups of intermediate outputs.

6. The method of claim 5 wherein the step of assigning a plurality of symbols to each of said k groups of intermediate outputs includes the step of assigning said symbols to minimize the probability of bit error associated therewith by maximizing a quantity L equal to the length of a shortest event error path through said trellis.

7. The method of claim 6 wherein the step of assigning said symbols to minimize the probability of bit error by maximizing a quantity L includes the step of maximizing the number of nonzero pairwise Euclidean squared distances $d^2$ between the symbols along branches of the shortest event error path through a trellis representing said symbol with those of the correct path through said trellis.

8. The method of claim 7 including the step of assigning symbols to minimize the probability of bit error $P_b$ given by:

$$P_b = (C/b)[(1+K)e^{-K/(E_b/N_o)}]^L$$

where $E_b/N_o$ represents bit energy-to-noise ratio, K is a channel parameter which represents the ratio of power received directly to that received indirectly, b is the number of input bits to the encoder, and C is a constant that relates to the product of the distances.

* * * * *

UNITED STATES PATENT AND TRADEMARK OFFICE
CERTIFICATE OF CORRECTION

PATENT NO. : 4,922,507

DATED : May 1, 1990

INVENTOR(S) : Marvin K. Simon and Dariush Divsalar

It is certified that error appears in the above-identified patent and that said Letters Patent is hereby corrected as shown below:

Column 9, lines 7 and 27, equations [4a] and [4b], "n=$\eta$", should be -- n$\epsilon\eta$ --.

Column 9, lines 28, 32, and 34, equation [4b], "(HK)", should be -- (1+K) --.

Column 9, line 37, "$\Lambda$", should be -- $\eta$ --.

Column 9, line 55, equation [5], "($e_b/N_o$)]L", should be -- ($E_b/N_o$)]L --.

Column 11, lines 55, 59, and 61, "$A_oA_o$", should be -- $A_o \otimes A_o$ --.

Column 12, lines 1, 7, and 38, "$A_oB_i$", should be -- $A_o \otimes B_i$ --.

Column 12, lines 39 and 50, "$A_o\ B_o$", should be -- $A_o \otimes B_o$ --.

Column 13, Table 2, "Ao Bo" should be -- $A_o \otimes B_o$ -- throughout.

Column 14, Table 3 "$C_o\ D$", should be -- $C_o \otimes D$ -- throughout.

Column 14, line 67, "k $\geq$ 2", should be -- k > 2 --.

UNITED STATES PATENT AND TRADEMARK OFFICE
CERTIFICATE OF CORRECTION

PATENT NO. : 4,922,507

DATED : May 1, 1990

INVENTOR(S) : Marvin K. Simon, et. al.

It is certified that error appears in the above-identified patent and that said Letters Patent is hereby corrected as shown below:

Column 15, line 1, equation [8], the last term "$Z^{n*im}$", should be -- $Z_i^{n*m}$ --.

Signed and Sealed this

First Day of September, 1992

Attest:

DOUGLAS B. COMER

*Attesting Officer*      Acting Commissioner of Patents and Trademarks